US006569044B1

(12) United States Patent
Sen et al.

(10) Patent No.: US 6,569,044 B1
(45) Date of Patent: May 27, 2003

(54) EMERGENCY HYDRAULIC CONTROL FOR ADJUSTING A CONSTANT CLAMPING FORCE RATIO WITH REGARD TO A CONTINUOUSLY VARIABLE TRANSMISSION

(76) Inventors: Mehmet-Fatih Sen, Freiherr-von-Varnbuehler-Strasse 4, D-71282 Hemmingen; Ewald Spiess, Helmut-Ulmer-Strasse 38, D-71665 Vaihingen/Enz; Karl-Heinz Senger, Bussardweg 8, D-74369 Loechgau; Joachim Luh, Eschenweg 2, D-74321 Bietigheim-Bissingen; Peter Baeuerle, Balinger Strasse 24, D-71636 Ludwigsburg, all of (DE)

( * ) Notice: Subject to any disclaimer, the term of this patent is extended or adjusted under 35 U.S.C. 154(b) by 0 days.

(21) Appl. No.: 09/155,880
(22) PCT Filed: Jan. 23, 1998
(86) PCT No.: PCT/DE98/00204
§ 371 (c)(1),
(2), (4) Date: Oct. 7, 1998
(87) PCT Pub. No.: WO98/53226
PCT Pub. Date: Nov. 26, 1998

(30) Foreign Application Priority Data

May 20, 1997 (DE) .......................................... 197 21 027

(51) Int. Cl.[7] .......................... F16H 59/00; B60K 41/12
(52) U.S. Cl. .......................................... 474/28; 477/45
(58) Field of Search ........................ 474/18, 28, 70; 477/48, 45, 906

(56) References Cited

U.S. PATENT DOCUMENTS

| | | | | |
|---|---|---|---|---|
| 4,685,357 A | * | 8/1987 | Sawada et al. | 477/45 X |
| 4,841,814 A | * | 6/1989 | Satoh | 477/45 |
| 4,857,034 A | * | 8/1989 | Kouno et al. | 477/45 X |
| 5,203,233 A | * | 4/1993 | Hattori et al. | 477/45 |
| 5,665,023 A | * | 9/1997 | Aoki et al. | 474/28 X |
| 5,885,178 A | * | 3/1999 | Luh | 474/28 |
| 5,888,168 A | * | 3/1999 | Niiyama et al. | 474/28 X |

FOREIGN PATENT DOCUMENTS

| | | |
|---|---|---|
| DE | 44 36 506 A1 | 4/1996 |
| DE | 196 09 785 | 9/1997 |

* cited by examiner

Primary Examiner—David A. Bucci
Assistant Examiner—Marcus Charles

(57) ABSTRACT

In an emergency hydraulic control, in which in an open hydraulic circuit for supplying the various piston chambers of the secondary and primary axial adjusters, at least one throttle valve is disposed. For regulating the primary and secondary pressure, a primary and secondary valve are used, respectively. Each valve is triggered in turn via a respective electromagnetically actuated pilot control valve in the pilot control valve that opens in emergency operation; the pilot control valves are connected to the outlet of the secondary valve, among others, via orifice valves. The pressure fluid pressure in the primary piston chamber is additionally limited by a pressure limiting valve. The outlet of this pressure limiting valve is connected via a control line to the control line located between the primary pilot control valve and the primary valve. At the same time, an orifice valve is disposed between the discharge point of the control line, disposed at the outlet of the pressure limiting valve, into the control line arriving from the pilot control valve and the branching point of this control line from the lead line to the primary-side pilot control valve.

The emergency hydraulic control makes a constant clamping force ratio possible, even at low pump feed quantities or low engine speeds. As a result, on startup of the vehicle, a gear ratio adjustment to "overdrive" is avoided, and the next time the engine is started a gear ratio adjustment in the direction of "low" is possible.

12 Claims, 4 Drawing Sheets

EMERGENCY HYDRAULIC CONTROL FOR ADJUSTING A CONSTANT CLAMPING FORCE RATIO WITH REGARD TO A CONTINUOUSLY VARIABLE TRANSMISSION

BACKGROUND OF THE INVENTION

The invention is based on an emergency hydraulic control.

From German Patent Disclosure DE 196 09 785, which had not been published before the priority date of the present application, a similar emergency hydraulic control for an electronically controlled continuously variable transmission (CVT) is known. The CVT described there, which is preferably used in automobiles, has a controller for emergency operation that in the event of failure of the electrical triggering of the normal driving mode causes a switch to a shifting position with a high gear ratio, in order to create more-favorable restarting and startup conditions. In this controller, among other things, the ratio between the primary and secondary clamping force between the traction means of the pairs of bevel gears is kept constant via an intermediate gear ratio range. In the intermediate gear ratio range, the gear ratio varies as a function of the torque demand of the power takeoff shaft. At a high torque demand, a high gear ratio is selected, which allows starting up from a stop, while at a low torque demand, that is, when an overrunning moment occurs, a low gear ratio is set. The means required to accomplish this will be discussed in the description of FIGS. 1 and 2.

SUMMARY OF THE INVENTION

The emergency hydraulic control according to the invention is needed to enable using a continuously variable loop transmission over the entire gear ratio range without reinforcement from an electrohydraulic triggering that is active during the normal driving mode. With the aid of the emergency hydraulic control, on vehicle starting a startup gear ratio in the low range is to be set, for instance to enable starting up on an uphill slope or when leaving an underground garage. The emergency controller should also set a gear ratio in the "overdrive" range at high vehicle speeds and low engine torque. What is important in this respect is that during overrunning, for instance when the vehicle is being braked, the gear ratio not drop all the way into the "overdrive" range and that immediately after a new rapid rpm increase of the vehicle motor dictated by startup or acceleration procedures, it adjust [?] itself in the direction of "low".

In the emergency hydraulic control of the invention, the clamping force ratio is varied as a function of the volumetric pumping flow supplied or of the engine rpm. To that end, at least one throttle valve is disposed in an open hydraulic circuit for supplying the respective piston chambers of the secondary and primary axial adjusters. The volumetric-flow-dependent pressure change established at the throttle valve—reinforced by further valves—varies the contact pressure in the corresponding pair of bevel gears. To regulate the primary and secondary pressure, a respective primary and secondary valve is used. Each valve is triggered in turn via a respective electromagnetically actuated pilot control valve in the pilot control valve that, opens during emergency operation, and the pilot control valves are connected among others to the outlet of the secondary valve via orifice valves. The pressure fluid pressure in the primary piston chamber is additionally limited by a of by. The outlet of this pressure limiting valve is connected, via a control line, to the control line located between the primary pilot control valve and the primary valve. At the same time, an orifice valve is disposed between the discharge point of the control line, disposed at the outlet of the pressure limiting valve, into the control line arriving from the pilot control valve and the branching point of this control line from the lead line to the primary-side pilot control valve.

Among others in the overrunning mode, that is, when the gear ratio is moving in the direction of "overdrive", upon a brief increase in engine speed in the emergency mode, this hydraulic circuit reacts with a primary pressure rise, at which the limiting pressure of the primary pressure limiting valve is exceeded.

The pressure fluid that as a result briefly backs up in the control line is between the orifice valve and the control input of the primary valve, moves the primary valve into a return position, in which the primary piston chamber is relieved to the tank. This increases the gear ratio of the loop transmission, thus enabling re-acceleration of the vehicle.

Further details of the invention will become apparent from the dependent claims, which are not recited at this point, and the drawing descriptions.

BRIEF DESCRIPTION OF THE DRAWINGS

An exemplary embodiment of the invention is shown along with the prior art in a schematic drawing in the form of a hydraulic circuit diagram and is described in further detail in the ensuing description of the drawings, including with the aid of a simplified or idealized graph. Shown are.

DESCRIPTION OF THE PREFERRED EMBODIMENT

Figure 1:
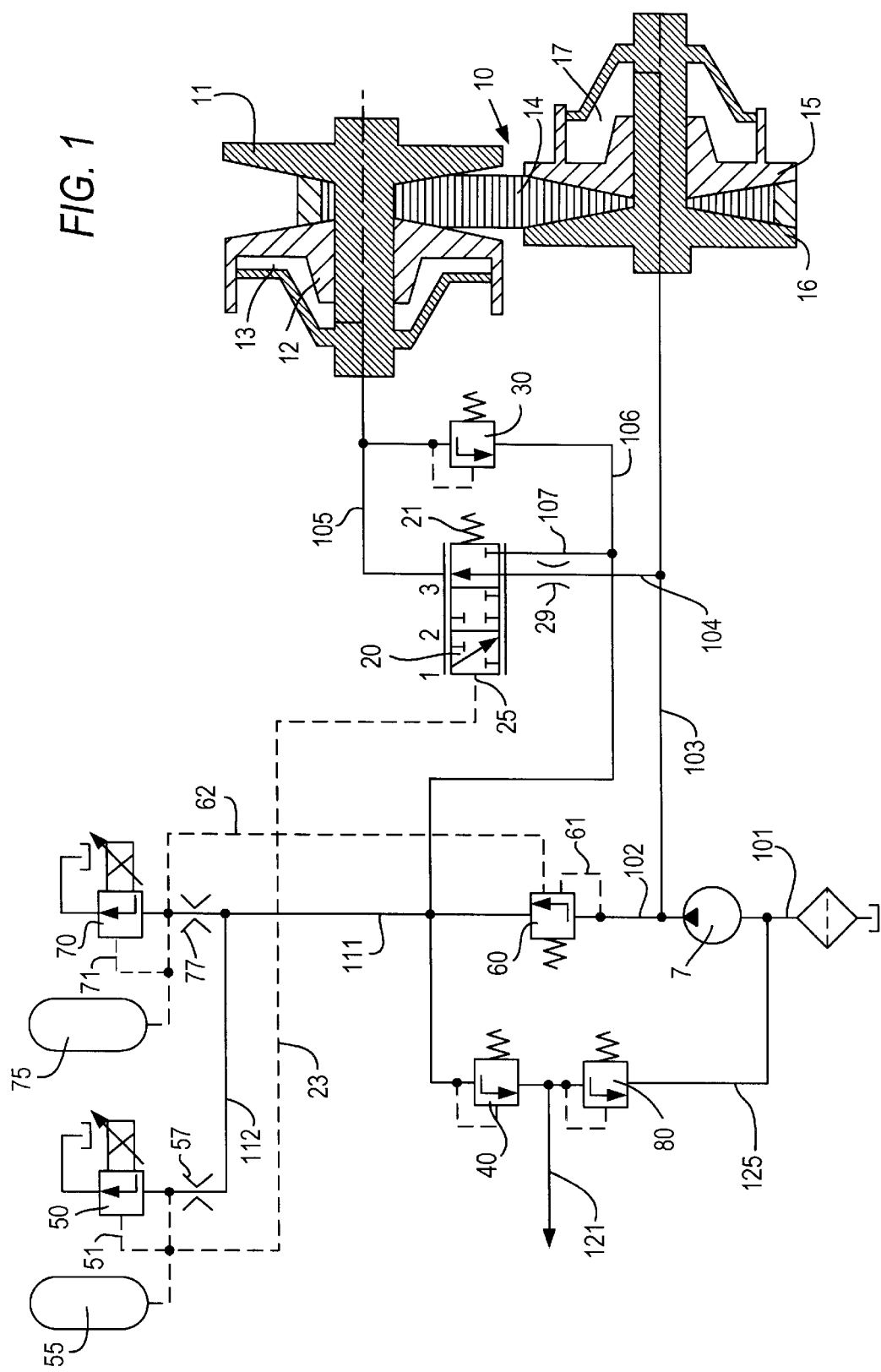
FIG. 1, a hydraulic circuit diagram for setting a preselected clamping force ratio, FIG. 2, a clamping force ratio graph, FIG. 3, a hydraulic circuit diagram as in FIG. 1, with a throttle valve in the control line leading to the primary valve, FIG. 4, a hydraulic circuit diagram as in FIG. 3, with two further orifice valves.

FIG. 1 shows a detail, corresponding to the prior art, from a hydraulic circuit diagram for controlling the hydraulic oil pressures of the power- and power takeoff-side pressure cylinders of a continuously variable loop transmission. The known loop transmission (10) includes two bevel gear pairs, between which a transmission means (14) is located, such as thrust member belt [? Schubgliederband], chain, V-belt, or the like. Each pair of bevel gears comprises two bevel gears (11, 12; 15, 16), which are embodied so that they can be braced against one another hydraulically. The piston and cylinder parts required for this purpose are preferably integrated with at least some of the bevel gears. The piston chambers enclosed by these parts are the piston chamber (13) on the primary side and the piston chamber (17) on the secondary side. They are acted upon by the requisite operating pressure in accordance with the gear ratio to be set. The bevel gear pair on the primary side is driven by the vehicle engine, for instance, while the bevel gear pair on the secondary side acts upon the drive train of the vehicle.

To impose the requisite clamping forces on the gear pairs (11, 12) and (15, 16), a hydrostatic pump (7), driven for instance by the vehicle engine, supplies the two piston chambers (13) and (17) with hydraulic oil; in the versions described here, the requisite secondary pressure on the power takeoff side is greater than or equal to the requisite primary pressure on the drive side.

The piston chamber (17) o the secondary side is supplied with pressure fluid via a work line (102) and a secondary line (103) without the interposition of a valve. The secondary pressure is set with the aid of a secondary valve (60) and a pilot control valve (70). Located between the two valves (60) and (70) is a work line (111). In the work line (111), an orifice valve (77) is disposed upstream of the pilot control valve (70).

The secondary valve (60) is an externally controlled pressure limiting valve. The pilot-control valve (70) is an electromagnetically actuated pressure limiting valve, whose outlet is relieved to the tank. The control line (71) of the pilot control valve (70) branches off downstream of the orifice valve (77). It is additionally connected to a hydraulic reservoir (75).

The primary oil pressure in the piston chamber (13) is set with the aid of a 3/3-way continuous-path valve (20). This primary valve (20), which is supplied from the secondary work line (103) via a work line (104), is connected to the piston chamber (13) via a primary pressure line (105). The primary valve (20) has a control connection (25) on the left-hand side and a mechanical restoring spring (21) on the right-hand side. A throttle valve (29) is seated in the work line (104) leading to the inflow connection of the valve (20). A work line (106) branches off from the primary pressure line (105). The work line (106) leads via two pressure limiting valves (30) and (40) into a transmission lubricant line (121).

A return line (107) connected to the outlet of the primary valve (20) discharges into the work line (106). The pressure limiting valve (30) is located between this discharge point and the branching point of the return line (106) from the primary pressure line (105). The work line (111) intersects the work line (106) between the discharge point of the return line (107) and the pressure limiting valve (40).

A work line (112) branches off from the work line (111) and ends in an electromagnetically actuated pressure limiting valve (50) with tank relief. [i.e. that is relieved to the tank]. The pressure limiting valve (50) is a pilot control valve for the primary valve (20). An orifice valve (57) is disposed upstream of the valve, (50). The control line (51), to which a hydraulic reservoir (55) is connected, branches off between the orifice valve (57) and the inlet connection of the pilot control valve (50). A control line (23), which leads to the control connection (25) of the primary valve (20), is connected in the region of the branching point.

A tank return line (125) is disposed between the transmission lubricant line (121) and the tank. It discharges for instance into the work line (101) upstream of the pump (7). Seated in the tank return line (125) is a lubricant pressure valve (80). It is embodied as a pressure limiting valve, which sets an upper limit on the lubricant pressure.

If the triggering electronics fail, the electromagnets of the pilot control valves (50) and (70) are no longer supplied with current. The pilot control valves (50) and (70) open. The pressure in the control lines (62 and 23) drops. As a consequence, the secondary valve (60) sets the maximum limiting pressure, while the primary valve (20) moves into the switching position 3. The valve (30) in the work line (106) opens when a preset maximum primary pressure is exceeded. Pressure fluid flows out of the secondary line (103) via the work line (104), the throttle valve (29), the primary valve (20), the primary pressure line (105), the primary pressure limiting valve (30), and the work line (106) to the pressure limiting valve (40), where the pressure fluid for triggering the pilot control valves (50) and (70) is available.

Figure 2:
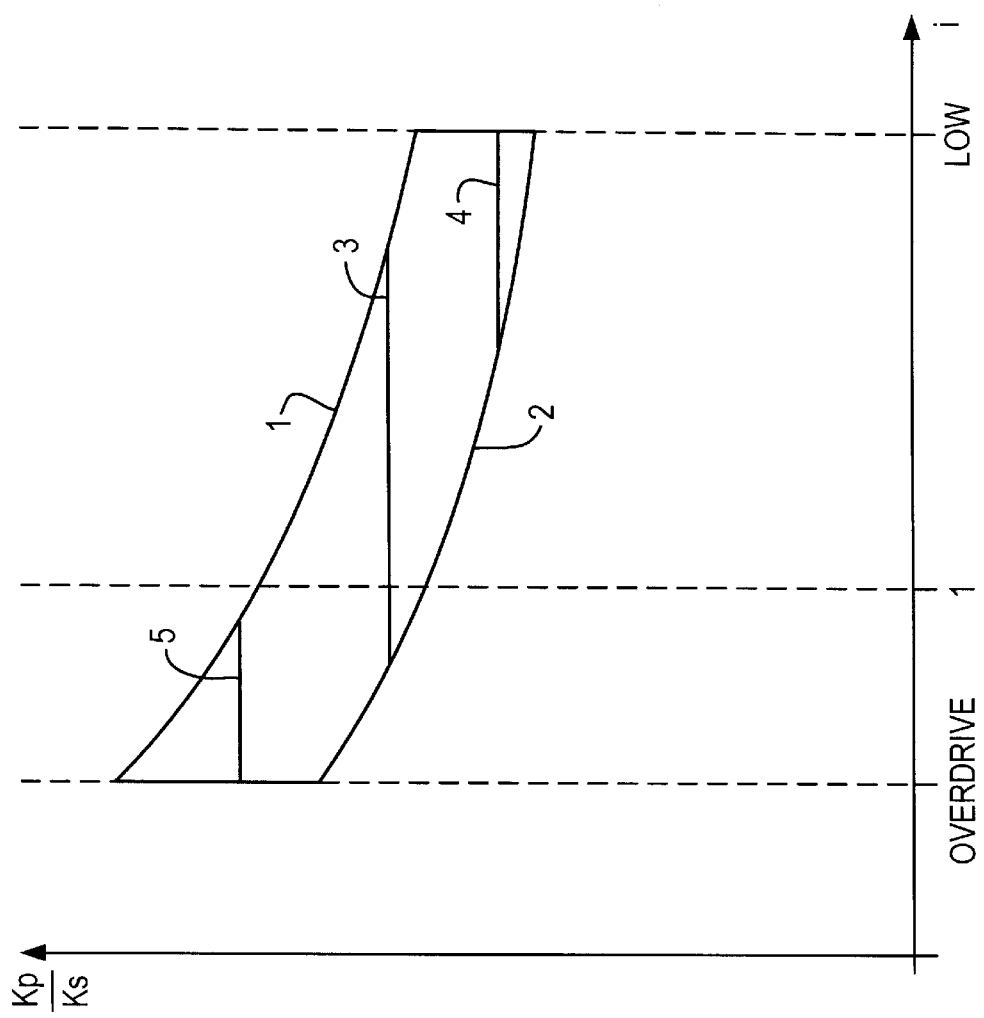

At constant limiting pressures of the valves (60) and (30), a constant clamping force ratio $K_p/K_s$ is established at the piston chambers (13) and (17);

FIG. 2 is a graph in which the ratio between the clamping force $K_p$ of the primary cylinder and the clamping force $K_s$ of the secondary cylinder is plotted schematically over the gear ratio (i) of the loop transmission. The gear ratio is plotted, rising toward the right, on the abscissa of the graph. The maximum gear ratio, marked "low", is as a rule selected for starting up the vehicle, while the minimal gear ratio, marked "overdrive", corresponds to the longest gear. The upper curve 1, spanning the entire gear ratio range, indicates the clamping force ratios that are required for transmitting torque in full-load operation. The lower curve 2, also spanning the entire gear ratio range, indicates the clamping force ratios for a torque of virtually zero to be transmitted.

The clamping force ratio $K_p/K_s$ that is established downstream of the hydraulic circuit of FIG. 1 [or after the hydraulic shifting?] is approximately equivalent to the middle horizontal line 3 in FIG. 2. Accordingly, a gear ratio adjustment is possible between virtually "low", for instance upon startup, and virtually "overdrive", for instance in overrunning at higher speeds.

The hydraulic circuit of FIG. 1, at low engine speeds, has a disadvantage, which can have an effect in starting up, among other situations. If the valve (30) opens after reaching the specified primary limiting pressure, then under some circumstances the entire volumetric flow fed by the pump (1) can be carried via the throttle valve (29), the primary valve (20), and the primary pressure limiting valve (30) to the pressure limiting valve (40), without the secondary valve (60) opening. As a result, the clamping force ratio is determined by the pressure drop at the throttle valve (29) and by the limiting pressure of the valve (30). The reduction in the secondary pressure causes the clamping force ratio $K_p/K_s$ to rise; that is, the line 3 shifts in the direction of the line 5. In line 5, the gear ratio of the transmission adjusts in the overrunning mode toward "override", and at full load only a slight adjustment of gear ratio in the direction of "low" is possible, which proves to be disadvantageous in starting up.

Figure 3:
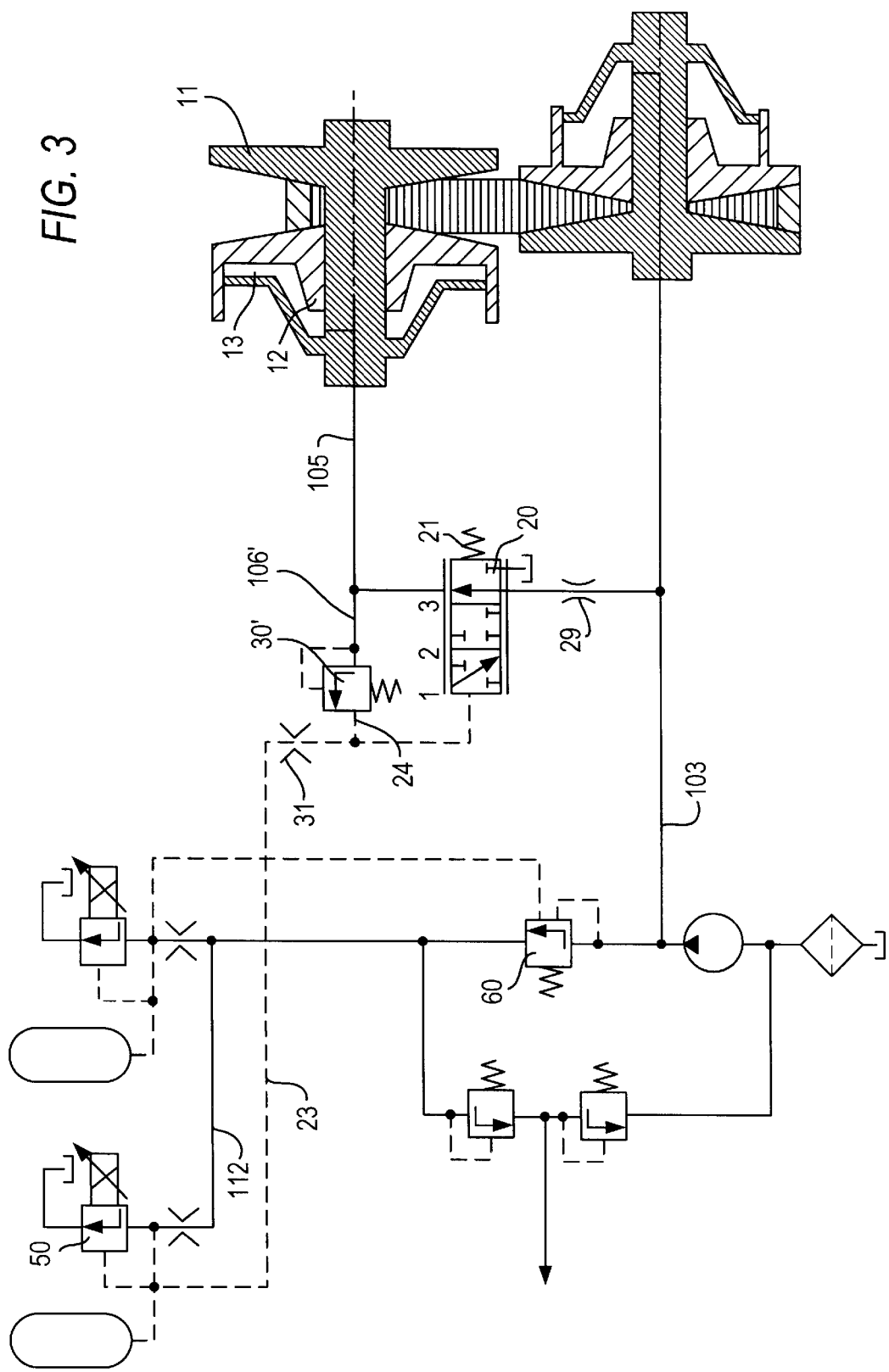

To assure a constant clamping force ratio even at low speeds of the vehicle engine, in the hydraulic circuit diagram of FIG. 3, the outlet of the primary pressure limiting valve (30') communicates via a control line (24) with the control line (23) leading to the primary pilot control valve (50). In the control line (23), an orifice valve (31) is disposed between the discharge point of the control line (24) and the pilot control valve (50). In addition, the return connection of the primary valve (20) communicates with the tank.

If the primary pressure in emergency operation exceeds the limiting pressure of the valve (30'), then pressure fluid flows out of the primary line (105) into the tank, via the opened pressure limiting valve (50). The pressure fluid in this process passes through the control line (106'), the valve (30'), the control line (24), and the control line (23) equipped with the orifice valve (31). If the primary pressure limiting valve (30') opens far enough, then upstream of the orifice valve (31) the pressure in the line (24) and the line (23) between the orifice valve (31) and the primary valve (20) rises, causing the slide of the primary valve (20) to move into the switching position 1, counter to the force of the restoring spring (21). As a result, the primary pressure line (105) is relieved directly into the tank. The pressure in the primary piston chamber (13) drops. The distance between the bevel gears (11) and (12) increases. The gear ratio of the loop transmission is adjusted in the direction of "low".

Since in the hydraulic circuit diagram of FIG. 3 only a small volumetric flow of pressure fluid from the secondary line (103) reaches the primary pressure line (105) via the throttle valve (29) and the primary valve (20), the secondary valve (60) already opens at small pump feed quantities or low speeds of the vehicle engine. Consequently, a constant clamping force ratio $K_p/K_s$ corresponding to the horizontal line 3 in the $K_p/K_s$ graph of FIG. 2 can be realized over a wide rpm range.

Since here only a slight volumetric flow of pressure fluid flows via the pressure limiting valve (30'), the valve can be made smaller in size, compared to the pressure limiting valve (30) of FIG. 1, and thus the emergency hydraulic control requires less installation space.

Figure 4:
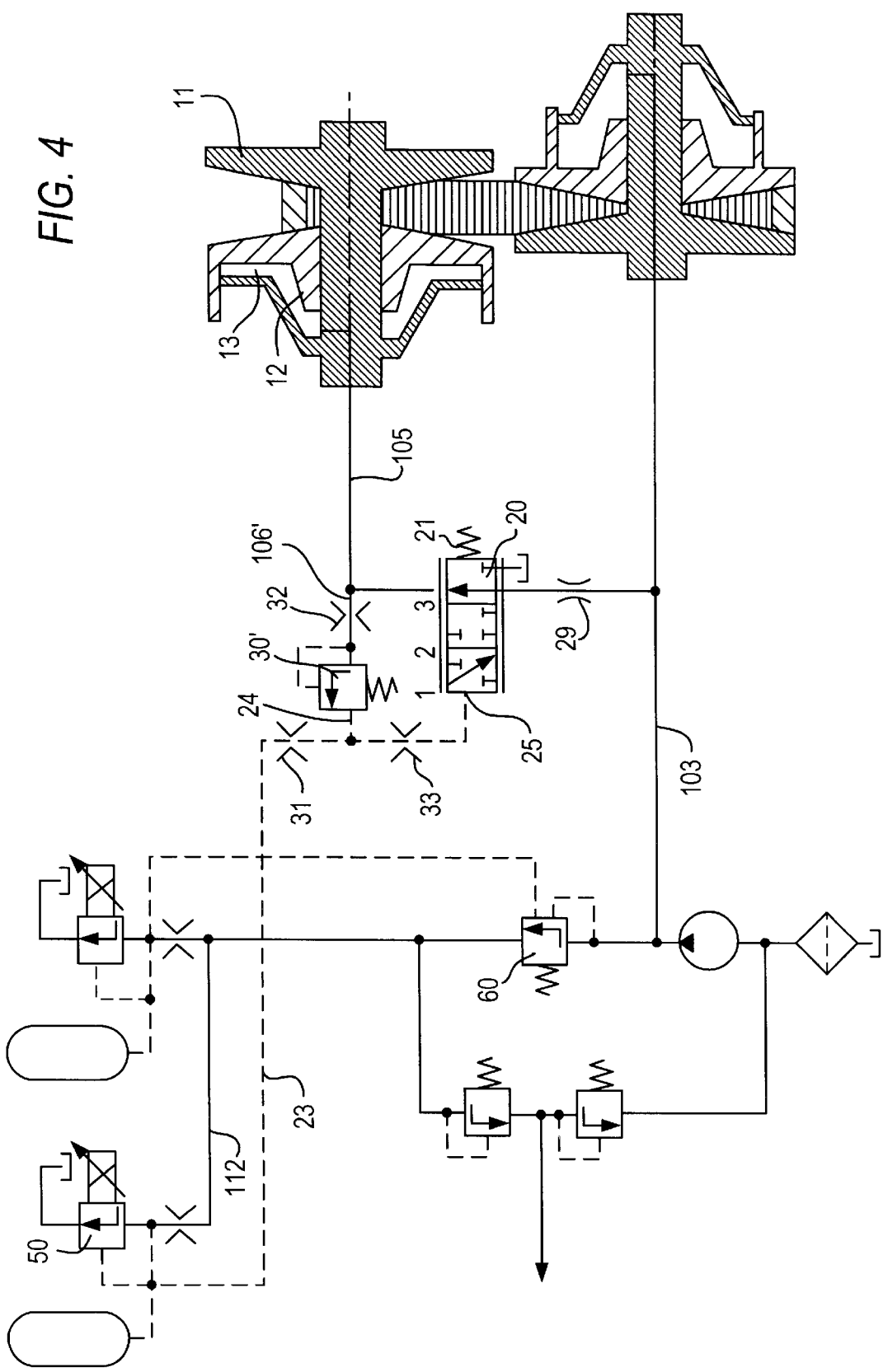

To vary the control pressure prevailing at the primary valve (20), one or two throttle or orifice valves (32, 33) can be disposed, both in the line (106') and in the control line (23) between the discharge point of the control line (24) and the control connection (25); see FIG. 4. The orifice valve (32) in the line (106') is seated upstream of the control line belonging to the primary pressure limiting valve (30') itself.

We claim:

1. An emergency hydraulic control for a gear-ratio-dependent variation of hydraulic oil pressures in a first and a second hydraulic bevel gear axial adjuster of a continuous variable loop transmission, the emergency hydraulic control comprising a pump which directly supplies at least a piston chamber of the second axial adjuster; at least one secondary valve limiting an oil pressure; a first electromagnetically actuated pressure limiting valve which is connected downstream of said secondary valve for remote control of said secondary valve; a first orifice valve disposed in a lead line to said first electromagnetically actuated pressure limiting valve; a control line for remote control of said secondary valve branching off downstream of said first orifice valve; a continuous-path valve supplied from a lead line to said piston chamber of said second axial adjuster so that a valve of a piston chamber of said first axial adjuster is supplied with pressure fluid; a throttle valve disposed between the lead line to said piston chamber of said second axial adjuster and said continuous-path valve; a second electromagnetically actuated pressure limiting valve which is connected downstream of said secondary valve and hydraulically controls said continuous-path valve; a second orifice valve disposed in a lead line of said second electromagnetically actuated pressure limiting valve; a further control line for controlling said continuous-path valve branching off downstream of said second orifice valve; a pressure limiting valve which limits a pressure in a lead line to said piston chamber of said second axial adjuster, said pressure limiting valve communicating via an additional control line with said control line for controlling said continuous-path valve; a third orifice valve disposed between a discharge point of said additional control line into said control line for controlling said continuous-path valve, and a branching point of said control line for controlling said continuous-path valve from a lead line to said first electromagnetically actuated pressure limiting valve.

2. An emergency hydraulic control as defined in claim 1; wherein said continuous-path valve is a three-three way valve with a slide fastened between a restoring spring and a hydraulic actuator with a control connection and has a middle blocking position.

3. An emergency hydraulic control as defined in claim 1, wherein said electromagnetically actuated pressure limiting valves are formed so that they are open when they are not supplied with current.

4. An emergency hydraulic control as defined in claim 1; and further comprising one hydraulic reservoir connected to each of control lines of said electromagnetically actuated pressure limiting valves.

5. An emergency hydraulic control as defined in claim 1; and further comprising an auxiliary pressure valve which limits a fluid pressure in a lead line of each of said electromagnetically actuated pressure limiting valves.

6. An emergency hydraulic control as defined in claim 5; and further comprising a further pressure limiting valve which follows downstream said auxiliary pressure valve as a lubricant pressure valve; and further comprising a lubricant line branching off upstream of an inlet of said lubricant pressure valve and having an outlet.

7. An emergency hydraulic control as defined in claim 6; and further comprising a tank into which said outlet of said lubricant line is relieved.

8. An emergency hydraulic control as defined in claim 6, wherein said pump has an intake connection, said outlet of said lubricant line being relieved into said intake connection of said pump.

9. An emergency hydraulic control as defined in claim 1; wherein at least some of said valves are spring loaded and have restoring springs with mechanically adjustable spring rates.

10. An emergency hydraulic control as defined in claim 1; at least some of said valves are spring loaded and have restoring springs with electrically adjustable spring rates.

11. An emergency hydraulic control as defined in claim 1; and further comprising a work line; and an additional orifice valve located in said work line.

12. An emergency hydraulic control as defined in claim 2; and further comprising an additional orifice valve disposed in said control line for controlling said continuous-path valve between a distance point of said further control line and a control connection.

* * * * *